United States Patent
Bohnert et al.

(10) Patent No.: US 9,527,746 B2
(45) Date of Patent: Dec. 27, 2016

(54) CARBONIZED ASPHALTENE-BASED CARBON-CARBON FIBER COMPOSITES

(75) Inventors: George Bohnert, Harrisonville, MO (US); James Lula, Lone Jack, MO (US); Daniel E. Bowen, III, Olathe, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 1090 days.

(21) Appl. No.: 13/477,603

(22) Filed: May 22, 2012

(65) Prior Publication Data

US 2013/0040520 A1    Feb. 14, 2013

Related U.S. Application Data

(60) Provisional application No. 61/521,463, filed on Aug. 9, 2011.

(51) Int. Cl.
| | |
|---|---|
| *C08K 7/02* | (2006.01) |
| *C01B 31/08* | (2006.01) |
| *C08K 3/04* | (2006.01) |
| *C08K 7/06* | (2006.01) |

(52) U.S. Cl.
CPC ............ *C01B 31/082* (2013.01); *C08K 3/04* (2013.01); *C08K 7/06* (2013.01); *Y10T 442/2984* (2015.04)

(58) Field of Classification Search
CPC ....... C04B 35/71; C04B 35/532; C01B 31/082
See application file for complete search history.

(56) References Cited

U.S. PATENT DOCUMENTS

| | | | | |
|---|---|---|---|---|
| 2,932,619 A | * | 4/1960 | Cole | C01B 31/082 502/434 |
| 3,908,061 A | * | 9/1975 | Byrne | B29C 70/04 428/299.1 |
| 4,089,934 A | * | 5/1978 | Akiyoshi | C01B 31/00 208/45 |
| 4,822,538 A | * | 4/1989 | Yoshida | C04B 35/528 264/105 |
| 5,057,254 A | * | 10/1991 | Sohda | C04B 35/83 264/29.2 |
| 5,587,203 A | * | 12/1996 | Soda | C04B 35/83 427/228 |
| 6,544,491 B1 | * | 4/2003 | Stiller | C01B 31/00 423/445 R |
| 2006/0261504 A1 | | 11/2006 | Simpson et al. | |
| 2007/0155849 A1 | * | 7/2007 | Miller | C04B 35/83 521/181 |
| 2011/0030940 A1 | | 2/2011 | Takeda | |

FOREIGN PATENT DOCUMENTS

CN          1315973          5/2007

* cited by examiner

*Primary Examiner* — Matthew Daniels
(74) *Attorney, Agent, or Firm* — Hovey Williams LLP

(57) ABSTRACT

A method of making a carbon binder-reinforced carbon fiber composite is provided using carbonized asphaltenes as the carbon binder. Combinations of carbon fiber and asphaltenes are also provided, along with the resulting composites and articles of manufacture.

9 Claims, 7 Drawing Sheets

CARBONIZED ASPHALTENE-BASED CARBON-CARBON FIBER COMPOSITES

CROSS-REFERENCE TO RELATED APPLICATIONS

The present application claims the priority benefit of U.S. Provisional Patent Application Ser. No. 61/521,463, filed Aug. 9, 2011, entitled ASPHALTENE REINFORCED CARBON FIBER COMPOSITES, incorporated by reference in its entirety herein.

FEDERALLY SPONSORED RESEARCH OR DEVELOPMENT

This invention was made with government support under contract #DE-NA0000622, awarded by the United States Department of Energy. The United States government has certain rights in the invention.

BACKGROUND

1. Field of the Invention

The present disclosure relates to carbon fiber composites formed using asphaltene-based binders.

2. Description of Related Art

Carbon fiber-reinforced composites are known in the art. Various precursors are used to produce carbon fibers of different morphologies and different specific characteristics. Typical precursors include polyacrylonitrile (PAN), cellulosic fibers (e.g., rayon, cotton), petroleum or coal tar pitch, and certain phenolic fibers. Carbon fibers are manufactured by the controlled pyrolysis of these precursors in fibrous form. There are typically three or four successive stages in the conversion of a precursor into carbon fiber. First, depending upon the precursor material, it can be subjected to spinning and drawing to convert the material into filaments. Next, the filaments are subjected to oxidative stabilization/thermosetting by stretching and simultaneously oxidizing the material at a predefined temperature. This treatment prepares the fibrous precursor to undergo additional processing at higher temperatures without changing the fiber form. The fibers are carbonized at elevated temperatures, typically 1500-1800° C., in an inert atmosphere (e.g., $N_2$). During this process the non-carbon elements are volatilized to yield carbon fibers. The carbon yield will depend on the starting material. Typically, a PAN precursor will give a yield of about 50% of the mass of the original PAN. Further heating up to 2500° C. will improve the ordering and orientation of the carbon, resulting in a higher percentage of graphitic structures in the fiber. Finally, the fiber may or not be subjected to a surface treatment to improve handling properties and increase bonding strength to adhesives.

Carbon fiber comes in several forms and has found wide applicability, primarily because carbon fibers have extremely high tensile strength per unit weight, anisotropically along the length of the fiber. The basic form available is a bundle of small diameter (5-10 microns) filaments containing from 1,000 to 24,000 individual filaments, and is called a tow. When mixed with an adhesive binding agent, these tows can be used as is, for winding cylindrical objects, such as high pressure tanks and cylinders. Or, the tows can be woven into many fabric designs and used for structural flat plates or curved shapes. The tows can be chopped into small lengths to produce a molding compound for more complex shapes. In each case, the carbon fiber provides a significant increase in the structural properties of the resultant product.

Conventional carbon fiber-reinforced composites consist of carbon fiber preforms impregnated with either a thermoplastic or thermosetting polymeric binder. Thermoplastic resins may include such materials as acrylonitrile butadiene styrene (ABS) and polyether ether ketone (PEEK), whereas thermosetting resins are typically epoxy, polyester, or phenolics. The carbon fiber provides the primary reinforcement for the composite and represents the largest volume fraction of the composite. The polymeric binder, which accounts for about one third of the composite volume, holds the composite together. As the strength of the composite is proportional to the volume fraction of each component, and given that carbon fiber typically has mechanical strength two orders of magnitude greater than polymeric binders, a carbon fiber reinforced composite provides far superior mechanical properties. On the other hand, most polymeric binders begin to soften or breakdown around 150-300° C., depending upon the material, and thus the use of polymeric binders impart thermal limitations on the composite.

With carbon fiber filaments exceeding 1,000,000 psi tensile strength now available, the weak link in a polymeric carbon fiber reinforced composite is the binder. Typical polymeric resin binders typically have tensile strengths of less than of 15,000 psi and a continuous use temperature limited to 200° C. or less. More recently, carbon-carbon composites prepared using carbonized thermosetting resins, carbonized pitch, or chemical vapor infiltration (CVI), have been employed. Pitch, bitumen, and asphalt are crude and inexpensive materials that are a by-product of petroleum refining. However, there is still a need in the art for improved composite products and manufacturing methods.

Asphaltenes are thought to consist of highly-ordered and complex aromatic ring structures typically containing small amounts of hydrogen, nitrogen, oxygen, sulfur, and/or heavy metals in addition to their primary constituent, carbon. They are large, planar, hetero-atom containing molecules that lend themselves to pi-pi bond stacking. Asphaltenes are a distinct chemical component of asphalt, which can be isolated from the resins in asphalt or pitch based on solubility by solvent extraction and other methods. They occur widely in heavy oil-producing formations, and are the non-melting (i.e., burns before melts) solid component of crude oil, giving such crude oils their color. For example, heavier, black-oil crudes, such as those found in tar sands, will typically have a higher asphaltene content.

SUMMARY

One embodiment is broadly concerned with a method of making a carbon binder-reinforced carbon fiber composite. The method comprises providing a plurality of asphaltenes dispersed or dissolved in a solvent system and a carbon fiber. The carbon fiber is contacted with the plurality of asphaltenes dispersed or dissolved in a solvent system to yield wetted carbon fiber. The solvent system is removed from the wetted carbon fiber to yield a dried asphaltene and carbon fiber combination. The asphaltenes in the dried asphaltene and carbon fiber combination are carbonized to thereby yield the carbon binder-reinforced carbon fiber composite.

A structure (combination) of carbon fiber having a surface, and asphaltenes deposited on the carbon fiber surface is also provided. The carbon fiber is selected from the group consisting of single fibers, fiber bundles, tows, woven fabric sheets, non-woven fabric sheets, knits, plies, mats, and combinations thereof. The combination can further comprise a solvent system. Alternatively, the combination can comprise dried asphaltenes and carbon fiber. The combination can also include carbonized asphaltenes.

The disclosure is also concerned with a composite comprising carbon fiber and a carbon binder, wherein the carbon binder is formed from carbonized asphaltenes. Articles of manufacture comprising such a composite are also provided, including nose cones for missiles, aircraft disc brakes, automotive disc brakes, atmosphere re-entry vehicle heat shields, missile guidance vanes, aircraft, aerospace, or automotive structural components, and aircraft, aerospace, or automotive powertrain components.

BRIEF DESCRIPTION OF THE DRAWINGS

FIG. is a structure of an asphaltene according to one or more alternative embodiments of the invention.

DETAILED DESCRIPTION

Figure 1:
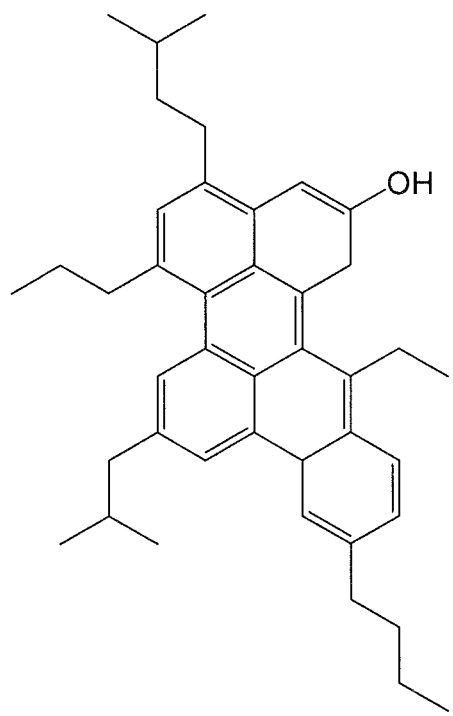
Figure 2:
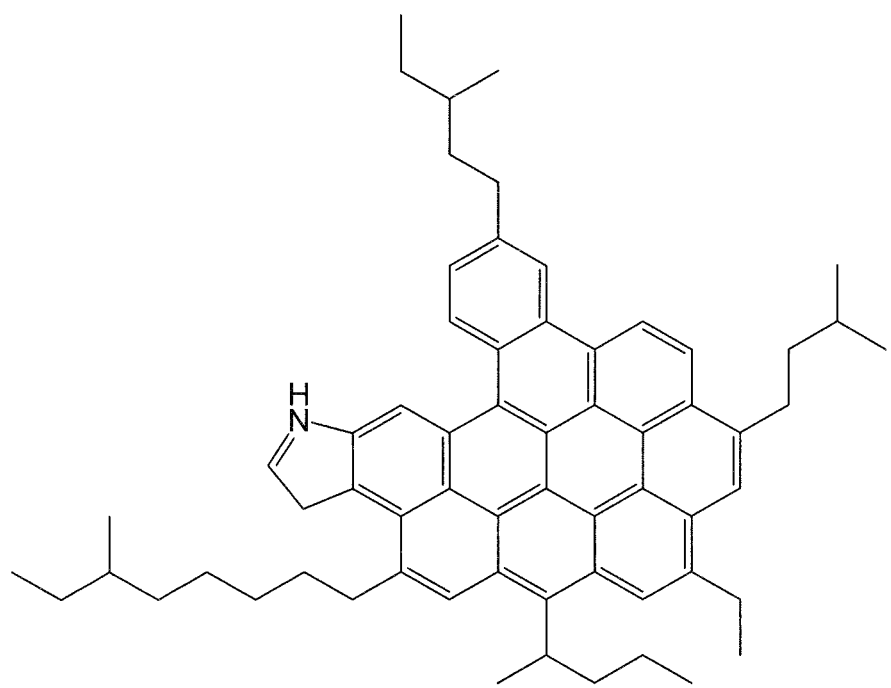
FIG. 2 is an idealized structure of an asphaltene according to one or more alternative embodiments of the invention.
Figure 3:
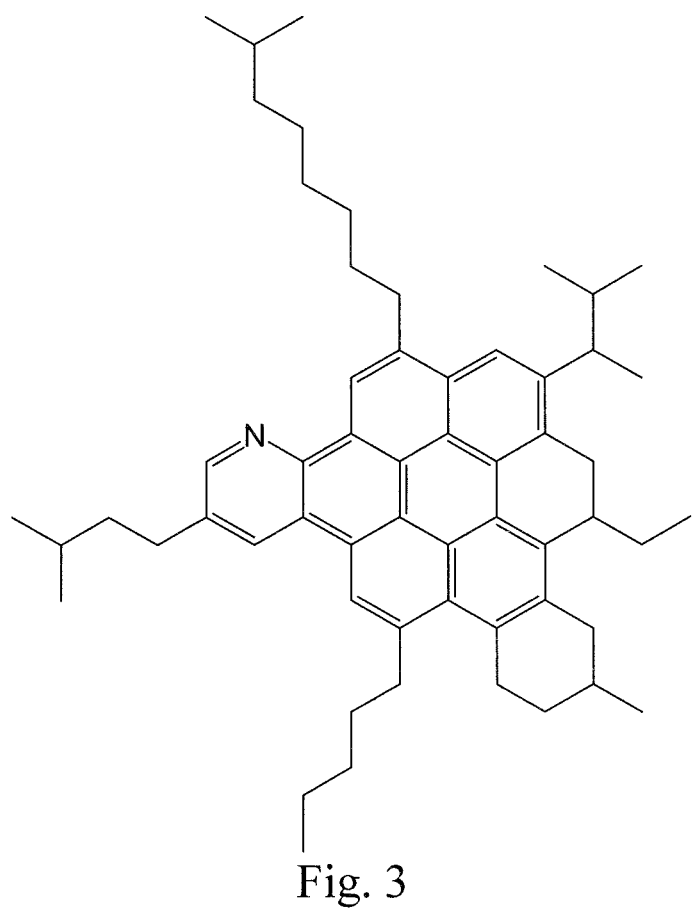
FIG. 3 is an idealized structure of an asphaltene according to one or more alternative embodiments of the invention.
Figure 4:
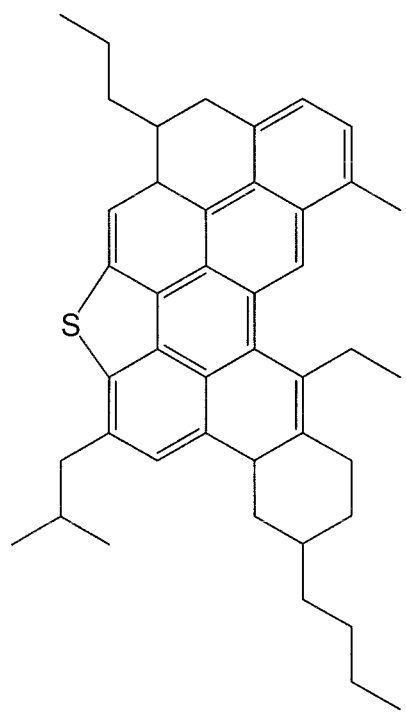
FIG. 4 is an idealized structure of an asphaltene according to one or more alternative embodiments of the invention.
Figure 5:
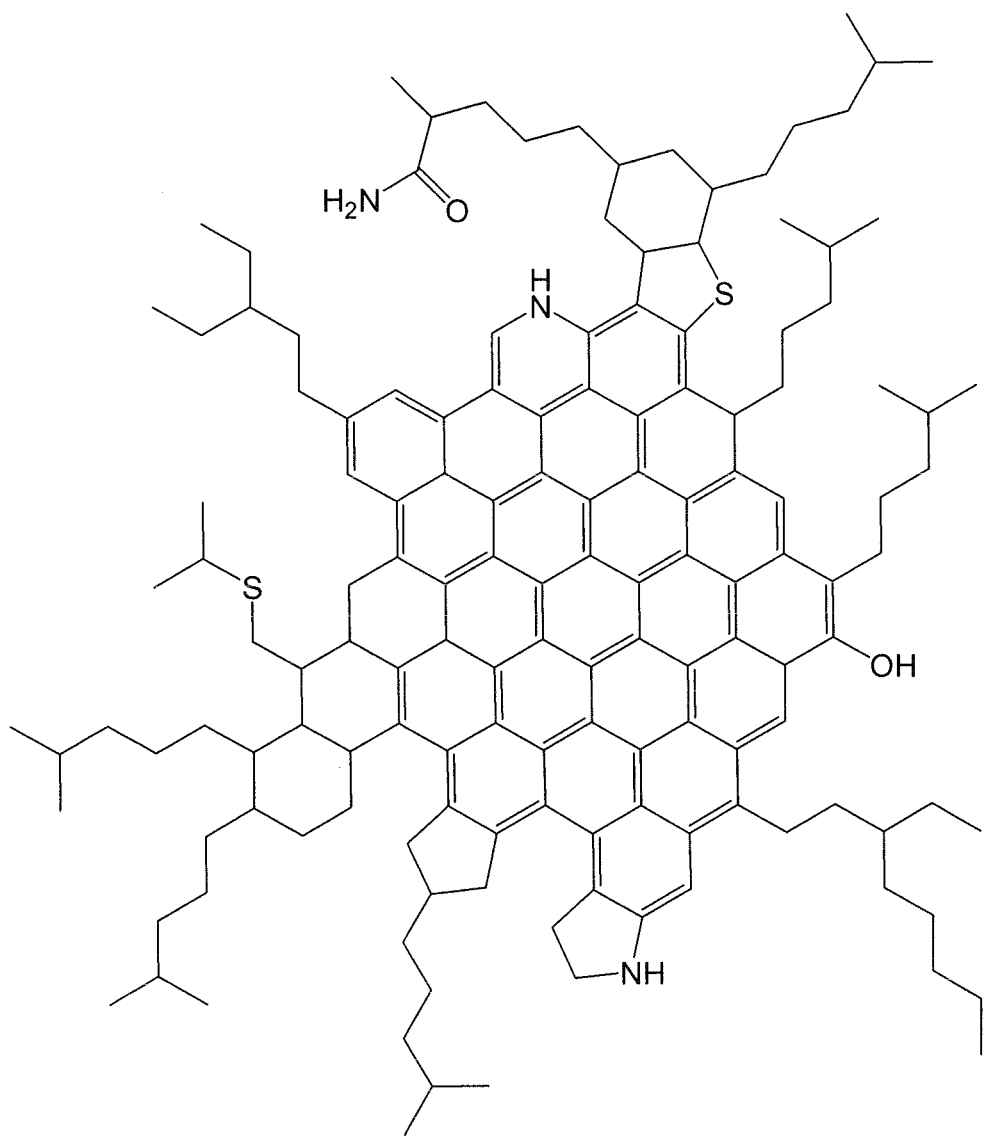
FIG. 5 is an idealized structure of an asphaltene according to one or more alternative embodiments of the invention.

Embodiments of the present disclosure include materials and methods to manufacture carbon-carbon fiber reinforced composites. Some embodiments are concerned with the partial or full replacement of conventional polymeric binders with a carbon binder in carbon-carbon fiber reinforced composites. The carbon binder is derived from the carbonization of asphaltenes deposited on and in-between adjacent carbon filaments and tows in a carbon fiber. The carbonized asphaltene binder provides strength and stiffness similar to the properties of the carbon fiber itself.

The carbon-carbon fiber composite is made by providing a carbon fiber and contacting the carbon fiber with a plurality of asphaltenes. In one or more embodiments, the plurality of asphaltenes are dispersed or dissolved in a solvent system. Carbon fibers for use in the invention include those derived from PAN, pitch, asphalt, phenolic fibers, rayon, cotton, lignin, or any other suitable natural product, or any other suitable carbon fiber precursor. The carbon fibers can comprise a surface treatment and/or sizing agents. In one or more embodiments, the carbon fibers are substantially free of sizing agents (i.e., the carbon fiber is not prepared using a sizing agent and/or the sizing agent has been removed from the fibers prior to contacting the carbon fibers with the asphaltenes). The fiber can be short-strand or long-strand, and can be in any form or alignment. Exemplary carbon fiber structures encompassed by the term "carbon fiber" in the present invention include, without limitation, a single fiber aligned in one direction, with or without a twist, fiber bundles, tows, and sheets of woven or non-woven fabrics, knits, plies, mats, and other suitable preform structure. Carbon fibers are commercially available from various sources including Toray Carbon Fibers America, Toho (Tenax), Mitusbishi (Grafil), Hexcel, Cytec, Zoltek, and others.

Asphaltenes for use in one or more embodiments of the present disclosure are highly aromatic, planar molecules, and have the ability to pi stack. They can be isolated (precipitated) from asphalt, bitumen, and/or crude oil using any method suitable for purposes of this invention. In one or more embodiments, the asphaltenes are non-polymeric (i.e., discrete) molecules, as opposed to carbonaceous polymer networks such as graphite or carbon black. Suitable asphaltenes are insoluble in n-pentane and/or n-heptane at a dilution ratio of approximately 40 parts alkane to approximately 1 part asphalt, bitumen, and/or crude oil, when mixed at approximately room temperature (~25° C.), and will preferably dissolve in toluene at the same dilution ratio and temperature. Furthermore, in some embodiments the asphaltenes will have a hydrogen to carbon (H/C) ratio of less than about 1.40, preferably less than about 1.35, more preferably less than about 1.30, and even more preferably approximately equal to or less than about 1.2 (as determined by elemental analysis). Asphaltenes can have a weight average molecular weight of from about 200 Da to about 2500 Da, preferably from about 300 Da to about 2000 Da, and even more preferably from about 400 Da to about 1500 Da. Some asphaltenes that could be used with the present invention may have a structure (or may include a portion having a structure) selected from the group consisting of structures shown in FIGS. 1-5.

Suitable solvent systems for use with the asphaltenes include carrier solvents such as toluene, tetrahydrofuran, terpenes (e.g., d-limonene and alpha-pinene), and mixtures thereof, although it is understood that many other solvents may be suitable for use in one or more embodiments depending on temperature. In one or more embodiments, the asphaltenes are mixed with the solvent system under ambient conditions (~25° C., ~760 mmHg) until a homogenous solution or dispersion is formed, although it is understood that higher concentrations of asphaltenes in a given solvent may be achieved at elevated temperatures, which may be more suitable for an industrial process. The solution or dispersion preferably comprises from about 5% to about 60% by weight asphaltenes, more preferably from about 10% to about 55% by weight asphaltenes, and even more preferably from about 15% to about 50% by weight asphaltenes, based upon the total weight of the solution or dispersion taken as 100% by weight.

The carbon fiber can be contacted with the plurality of asphaltenes using any suitable method for wetting the carbon fibers, including, without limitation, spraying, puddling, dipping and/or immersion of the carbon fiber with the asphaltene solution or dispersion. In the method, the asphaltene solution or dispersion is used in an amount sufficient to provide a weight ratio of carbon fiber to asphaltene of from about 100:1 to about 100:80, more preferably from about 100:5 to about 100:70, and even more preferably from about 100:10 to about 100:60. The carbon fiber is preferably contacted with the asphaltenes under ambient conditions (~25° C.; ~760 mmHg) for an amount of time sufficient to wet substantially all of the carbon fiber filaments. In other words, the asphaltenes preferably remain wetted (in solution) before or during application to the carbon fiber. When necessary, contact can be carried out under vacuum or elevated pressures (2 psia to 3,000 psia) to facilitate infusion of the asphaltene solution or dispersion into and throughout a preform structure (e.g., fiber bundles, tows, mats, etc.).

The wetted (asphaltene-saturated) carbon fibers can then be consolidated by pressing or molding the fibers into the desired shape and/or configuration, followed by removing the carrier solvent, yielding asphaltenes deposited on the surface of and in-between adjacent carbon filaments and tows in the carbon fiber. This can be accomplished by a combination of heat and/or decreased pressure. In one or more embodiments, the wetted carbon fibers are heated to a temperature of at least about the boiling point of the carrier solvent up to about 250° C. (and preferably from about 50° C. to about 250° C.), for a time period of from about 60 to about 1500 minutes. Decreased pressures or vacuum ($1\times10^{-3}$ mmHg) can also be used to help drive off the solvent.

The asphaltenes in the dried asphaltene and carbon fiber combination are then carbonized by heating the dried carbon fiber/asphaltene combination to a temperature of from about 1500° C. to about 1800° C. in an inert atmosphere such as nitrogen. Carbonization involves the gradual heating (typically in a furnace) of the combination from room temperature (~25° C.) up to about the desired temperature. As described herein, the time involved for this process includes the ramped furnace heat-up and cool down, as well as "dwell time," which is the amount of time that the composite is maintained at peak temperatures. In one or more embodiments, carbonization is completed in less than about 24 hours. Although carbonization is typically the most time-consuming and rate-limiting step in conventional carbon fiber composite manufacturing, the present method can be carried out much quicker due to a shorter carbonization dwell time period. During carbonization, non-carbon elements, such as hydrogen, oxygen, nitrogen, and sulfur, are driven from the asphaltene, in the form of $H_2$, $O_2$, $N_2$, etc., yielding essentially a carbon-bound, carbon-fiber composite. Carbon-carbon bonds form between the asphaltene structures and the carbon fiber to form a homogeneous, high-strength monolithic structure. It will be appreciated that the above-described process can be repeated by applying more asphaltenes to the carbon fiber composite followed by carbonization, until the desired composite shape or structure is formed. Generally, the process is repeated multiple times (e.g., 2-4 times) to form a solid composite substantially free of voids. The term "substantially free of voids," as used herein, means that less than 5% of the volume of the structure contains voids, based upon the total volume of the structure taken as 100% by volume.

Due to the high carbon yield from carbonizing the asphaltenes, the resulting composite has a higher density after the first pass, than traditional composites. The initial average true density of the composite, as measured using a helium pycnometer, will preferably be greater than about 1.9 grams/cc, and preferably greater than about 2 grams/cc. The "initial" average density is the density of the composite after only one pass (i.e., application through carbonization of the binder). In other words, with conventional binders (e.g., phenolics), about 50% of the binder mass is burned off during carbonization, leaving behind substantial voids in the composite that need to be filled by repeated passes. In addition, even pitch-based binders contain significant resinous components, primarily carboxylic and naphthenic acids which generate oxygen and hydrogen, along with other non-carbon elements that must be removed, including nitrogen and sulfur. This volatilization creates bubbles, and channels throughout the composite as the gases form and escape, thus reducing the density of the composite. As such, conventional composites require a number of passes to create a solid composite structure substantially free of voids. It will be appreciated that since the weakest link of a composite is at the interface between the carbon fiber and the binder, this "piecemeal" approach to fabricating a composite results in a structure having more of these interfaces, and consequently lower strength. By contrast, the formation of a more monolithic composite after a single pass, in the present method results in a stronger composite. It also reduces the number of passes necessary to create a solid structure.

In one or more embodiments, the composites will have a tensile strength of at least about 300 MPa. In inert atmospheres, the composites exhibit increasing strength (10-20%) with higher temperatures up to about 1800° C. The composites will have a high thermal resistance, which means that the composite will not degrade or lose its structural integrity at temperatures of at least about 2,000° C., and only lose 10-20% of its strength at about 1800° C. in air. Composites according to one or more embodiments can be used to make various articles of manufacture including, without limitation, nose cones for missiles, commercial and military aircraft disc brakes, automotive high performance disc brakes, atmosphere re-entry vehicle heat shields, missile guidance vanes, high performance and light weight aircraft, aerospace, or automotive structural and/or powertrain components and/or parts, and other composite parts requiring high strength and high thermal resistance.

Additional advantages of the various embodiments of the disclosure will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present disclosure encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with one or more embodiments. It is to be understood, however, that these examples are provided by way of illustration and nothing therein should be taken as a limitation upon the overall scope of the invention.

Example 1

In this Example, asphaltene/carbon fiber composite test samples were prepared. A carbon-based binder solution was prepared by dispersing asphaltenes in toluene to prepare a 20% wt solution. The asphaltene solution was then used to saturate a PAN-based, sized carbon fiber tow having 6,000 filaments, each 7 μm in diameter (M40B, Toray Carbon Fibers America, Santa Ana, Calif.). A total of 19.90 grams of carbon fiber tow (approximately 54 meters) was infused with 8 grams of asphaltene. The asphaltene-saturated carbon fiber was then subjected to consolidation by heating to 110° C. to evaporate the toluene. The infused tow was then cut into 100-mm sample lengths, followed by programmed carbonization to a final temperature of 1800° C. in an inert environment.

Figure 6:
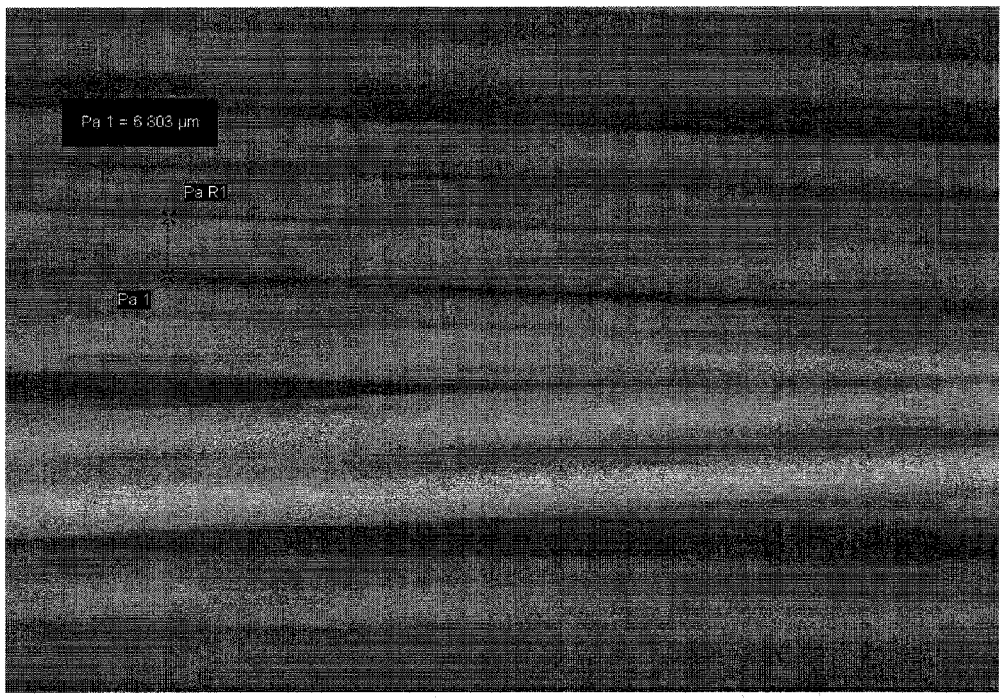
FIG. 6 is a scanning electron microscope (SEM) image of the carbon fiber control without asphaltene from Example 1 (1000× magnification)
Figure 7:
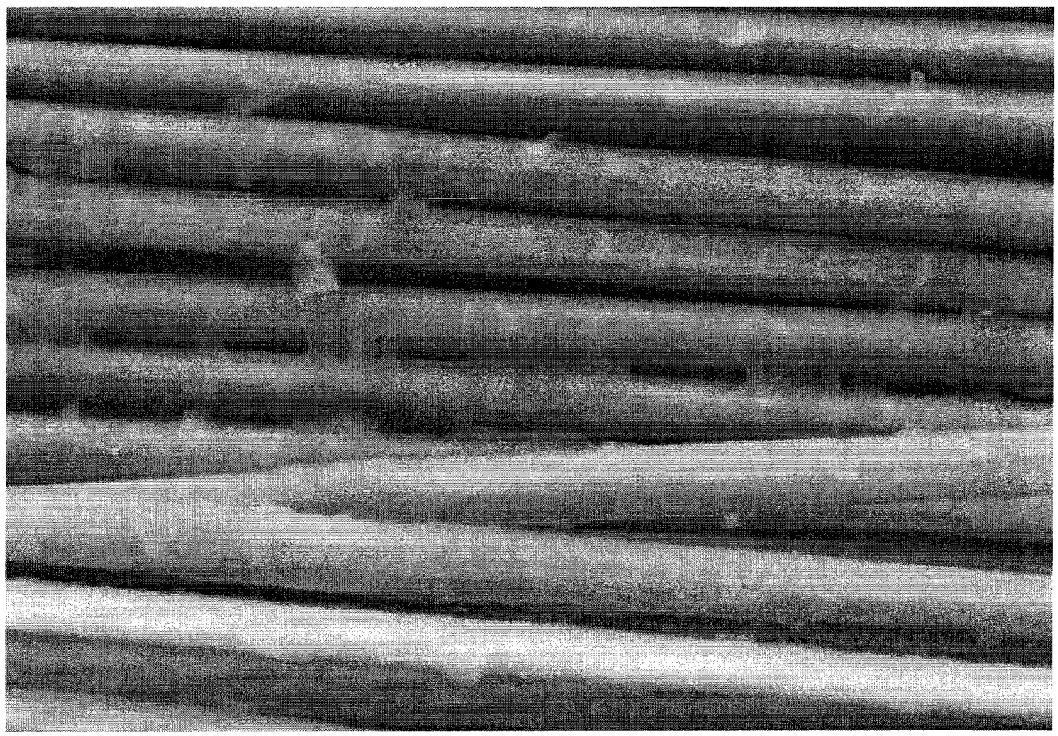
FIG. 7 is an SEM of localized carbonized asphaltene on the fibers from Example 1 (1000× magnification)
Figure 8:
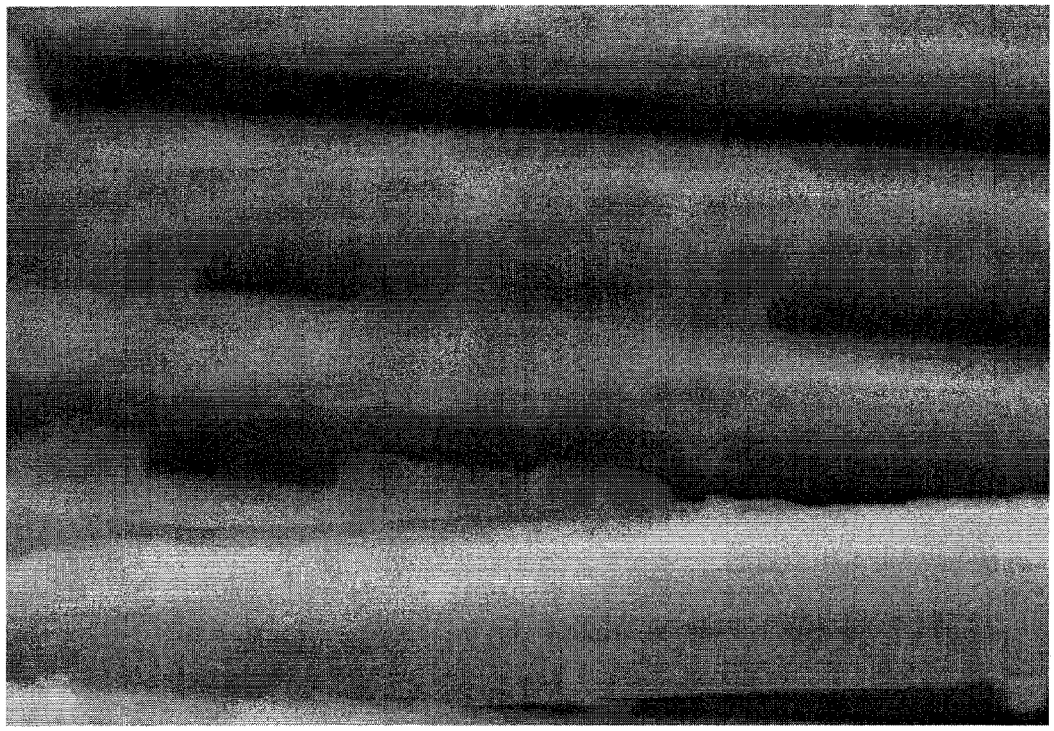
FIG. 8 is an SEM of localized carbonized asphaltene on the fibers from Example 1 (2500× magnification)
Figure 9:
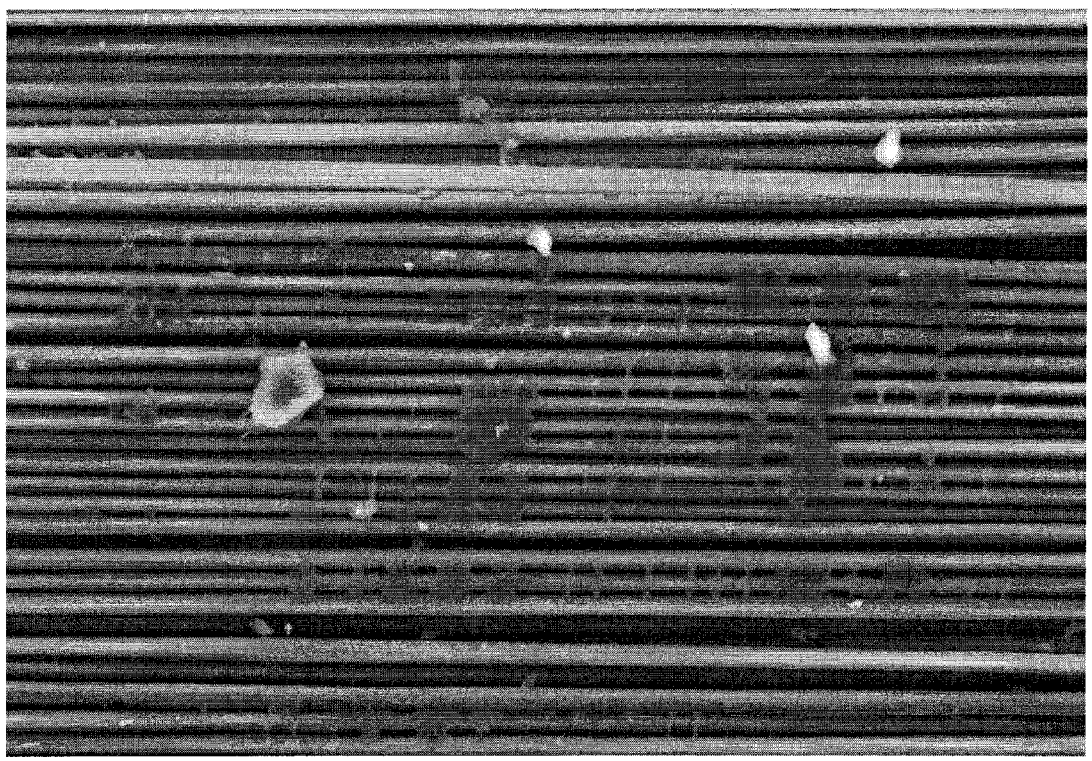
FIG. 9 is an SEM of localized carbonized asphaltene on the fibers from Example 1 (350× magnification)
Figure 10:
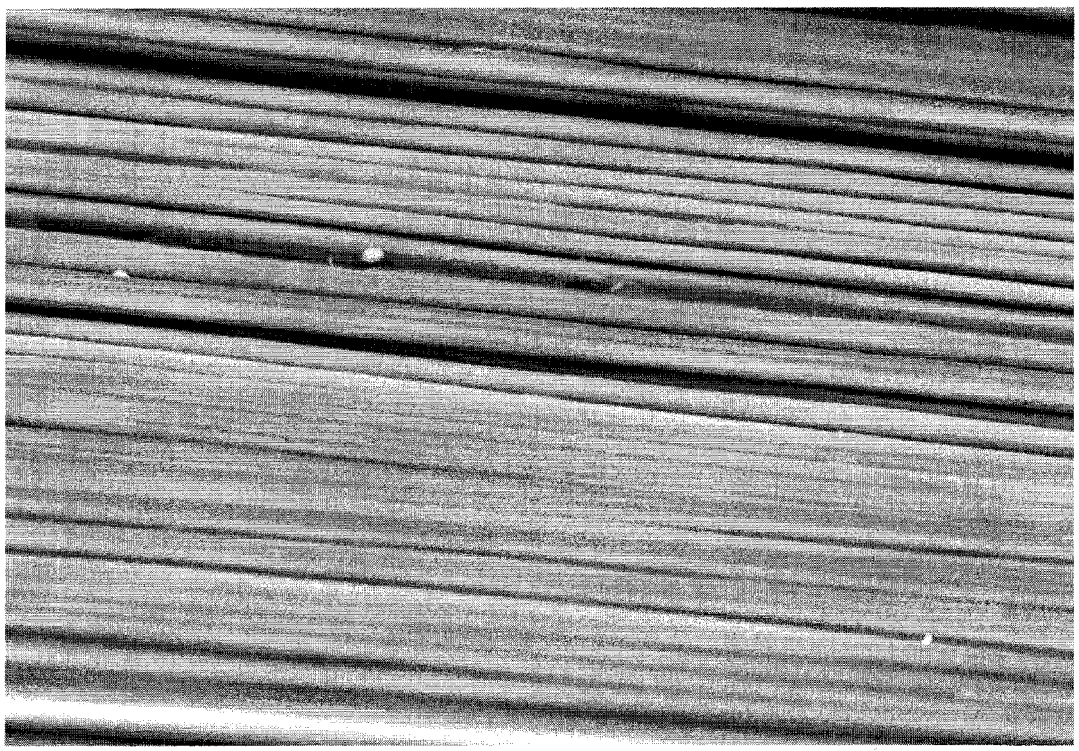
FIG. 10 is an SEM of fibers matted together with carbonized asphaltene from Example 1 (500× magnification)
Figure 11:
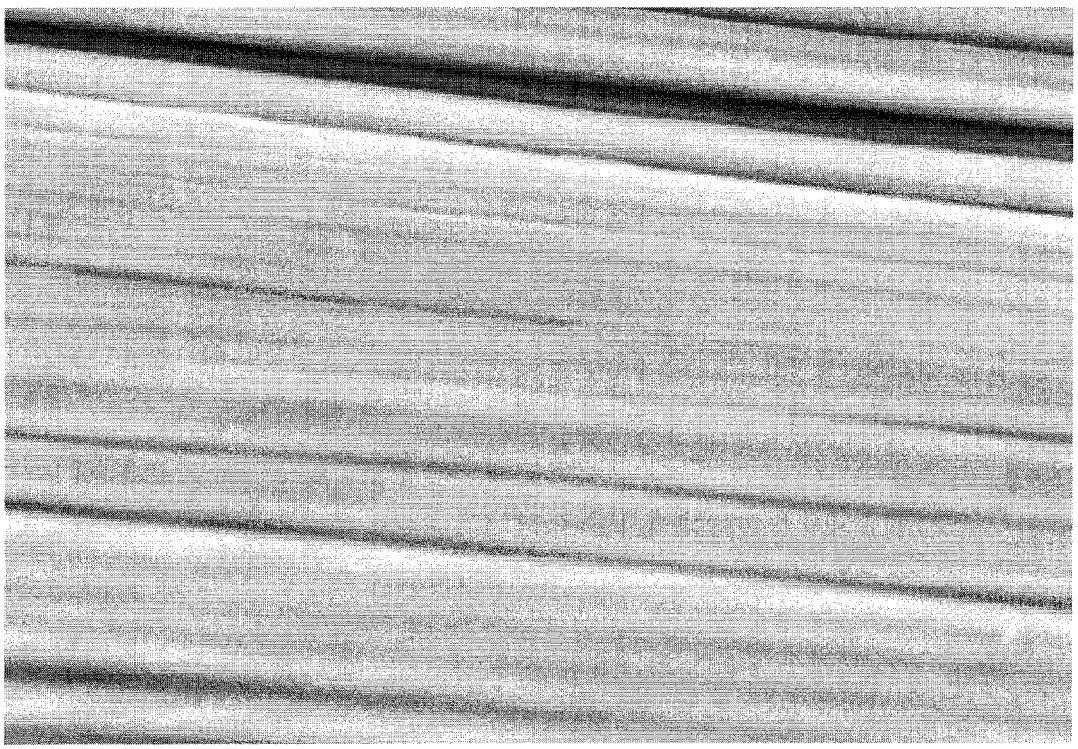
FIG. 11 is an SEM of fibers matted together with carbonized asphaltene from Example 1 (1000× magnification)
Figure 12:
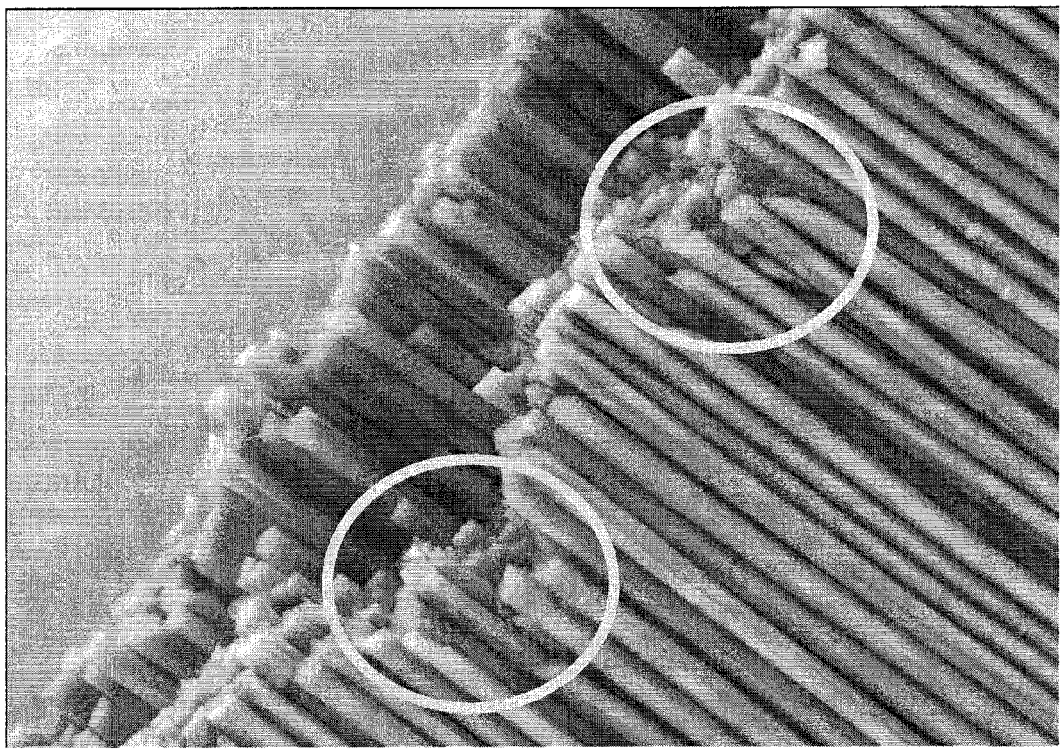
FIG. 12 is an SEM of fibers wetted with asphaltenes from Example 1 (500× magnification)
Figure 13:
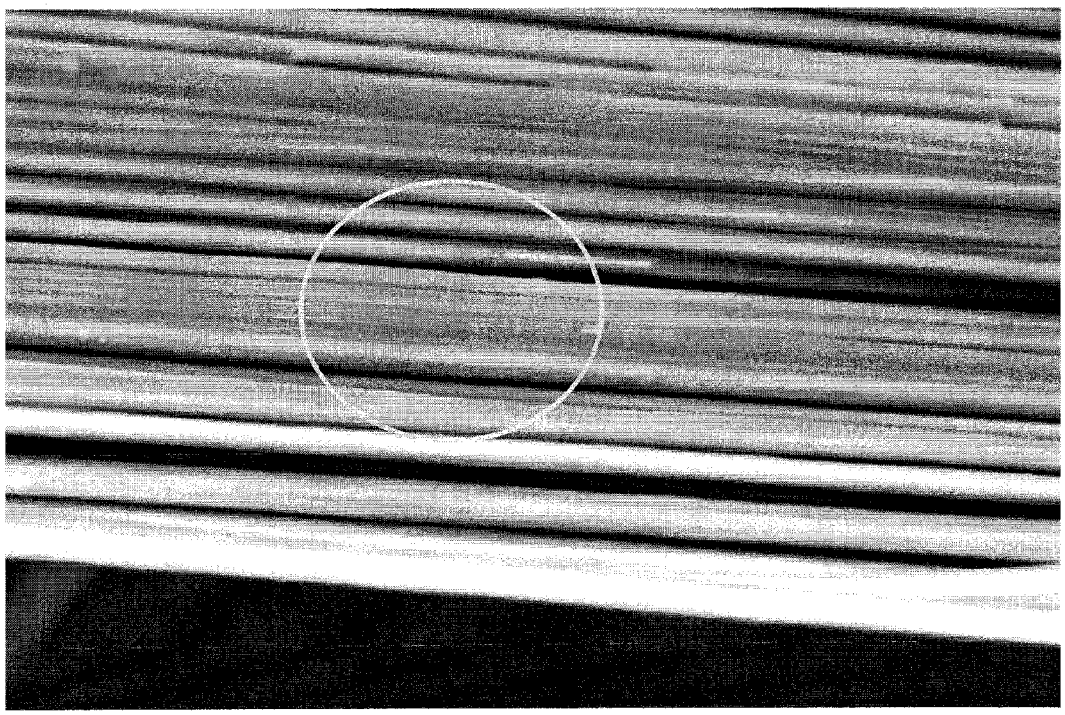
FIG. 13 is an SEM of asphaltenes covering individual carbon filaments from Example 500× magnification).

Tow samples after carbonization demonstrated a marked increase in density and stiffness, and SEM images depicted asphaltene wetting between adjacent carbon filaments. FIG. 6 is the control without asphaltene. The Toray carbon fiber control was measured to have an average true density of 1.8716 grams/cc, with a standard deviation of 0.0050 g/cc. Density was measured using a pycnometer and helium as the probe gas. The asphaltene reinforced carbon fiber composite average true density was measured to be 2.0264 grams/cc, with a standard deviation of 0.0073 g/cc. FIGS. 7-9 show localized carbonized asphaltene on the fibers, and FIGS. 10-11 show fibers matted together with carbonized asphaltene. In FIG. 12, highlighted areas show evidence of wetting and asphaltene adhesion in the fractured tow. The tow composite remains intact as individual filaments fracture and debris is imbedded into the matrix. In FIG. 13, the highlighted area demonstrates that individual carbon filaments are not visible because they are surrounded by asphaltene.

We claim:

1. A method of making a carbon binder-reinforced carbon fiber composite, said method comprising:
   (a) providing a carbon fiber;
   (b) providing a plurality of isolated asphaltenes dispersed or dissolved in a solvent system;
   (c) contacting said carbon fiber with said plurality of isolated asphaltenes dispersed or dissolved in a solvent system to yield a wetted asphaltene and carbon fiber combination;
   (d) removing said solvent system from said wetted asphaltene and carbon fiber combination to yield a dried asphaltene and carbon fiber combination; and
   (e) carbonizing said asphaltenes in said dried asphaltene and carbon fiber combination to thereby yield said carbon binder-reinforced carbon fiber composite, said composite having an initial true density of at least 1.9 grams/cc,
   said method further comprising repeating (c) through (e).

2. The method of claim 1, wherein the weight ratio of carbon fiber to asphaltene in said wetted carbon fiber is from about 100:1 to about 100:80.

3. The method of claim 1, wherein said contacting is carried out under ambient temperature.

4. The method of claim 1, wherein said removing comprises heating said wetted asphaltene and carbon fiber combination to a temperature of from at least about the boiling point of the solvent system up to about 250° C. for a time period of from about 60 to about 1500 minutes.

5. The method of claim 1, further comprising pressing said wetted asphaltene and carbon fiber combination into a mold before or during said removing.

6. The method of claim 1, wherein said carbonizing comprises heating said dried asphaltene and carbon fiber combination to a temperature of from about 1500° C. to about 1800° C. over a time period of approximately 24 hours.

7. The method of claim 1, wherein said composite has an initial average true density of greater than 2 grams/cc.

8. The method of claim 1, wherein said solvent system comprises a solvent selected from the group consisting of toluene, tetrahydrofuran, terpenes, and mixtures thereof.

9. The method of claim 1, wherein said carbon fiber is derived from a precursor selected from the group consisting of PAN, pitch, asphalt, phenolic fibers, rayon, cotton, and lignin.

* * * * *